United States Patent
Bastian et al.

(10) Patent No.: US 7,106,500 B2
(45) Date of Patent: Sep. 12, 2006

(54) RAMAN AMPLIFIER SYSTEM

(75) Inventors: Georg Bastian, Karlsruhe (DE); Ekaterina Bourova, Boulogne-Billancourt (FR)

(73) Assignee: Alcatel, Paris (FR)

( * ) Notice: Subject to any disclaimer, the term of this patent is extended or adjusted under 35 U.S.C. 154(b) by 37 days.

(21) Appl. No.: 10/825,120

(22) Filed: Apr. 16, 2004

(65) Prior Publication Data
US 2004/0207908 A1 Oct. 21, 2004

(30) Foreign Application Priority Data
Apr. 17, 2003 (EP) .................................. 03290956

(51) Int. Cl.
H01S 3/06 (2006.01)
H01S 3/16 (2006.01)
H01S 3/30 (2006.01)

(52) U.S. Cl. ...................................... 359/334; 359/342

(58) Field of Classification Search ................ 359/334, 359/342
See application file for complete search history.

(56) References Cited

U.S. PATENT DOCUMENTS

| | | |
|---|---|---|
| 4,786,140 A | 11/1988 | Melman |
| 6,483,633 B1 | 11/2002 | Onishi et al. |
| 6,879,604 B1 * | 4/2005 | Cook ............................. 372/3 |
| 6,888,667 B1 * | 5/2005 | Nicolaescu ................. 359/332 |

FOREIGN PATENT DOCUMENTS

GB 2394553 A * 4/2004

OTHER PUBLICATIONS

K. Suto et al, "Semiconductor Raman Amplifier for Terahertz Bandwidth Optical Communication", Journal of Lightwave Technology, IEEE, New York, US, vol. 20, No. 4, Apr. 2002, pp. 705-711, XP001130032.

K. Suto et al, "Raman amplification in GaP-AlxGal-xP waveguides for light frequency discrimination", IEE Proceedings: Optoelectronics, Institution of Electrical Engineers, Stevenage, GB, vol. 145, No. 2, Apr. 20, 1998, pp. 105-108, XP006011337.

T. Saito et al, "Gain of High-Intensity Pulse -Pumped Gap-Algap Waveguide Raman Amplifier", IEE Proceedings: Optoelectronics, Institution of Electrical Engineers, Stevenage, GB, vol. 146, No. 5, Oct. 1999, pp. 209-212, XP000928397.

R. Claps et al, "Stimulated Raman scattering in silicon waveguides", Electronics Letters, IEE, Stevenage, GB, vol. 38, No. 22, Oct. 24 200, pp. 1352-1354, XP006019142.

* cited by examiner

*Primary Examiner*—Mark Hellner
(74) *Attorney, Agent, or Firm*—Sughrue Mion, PLLC

(57) ABSTRACT

A Raman amplifier system, including an optical wave guide having a crystalline material for guiding an optical signal having a first wavelength, the crystalline material having a Raman wavelength shift, and a pump configured to pump light into the optical wave guide, the pump light having a second wavelength being substantially equal to the first wavelength minus the Raman wavelength shift.

12 Claims, 1 Drawing Sheet

RAMAN AMPLIFIER SYSTEM

The invention is based on a priority application EP 03290956.6 which is hereby incorporated by reference.

1. Field of the Invention

The present invention relates to the field of Raman amplifiers capable of being used for amplification of optical signals in various optical communication systems and a Raman amplification method.

2. Background and Prior Art

The principle of Raman optical amplification is as such known from the prior art. Raman amplifiers utilise stimulated Raman scatterings to create optical gain. A typical Raman amplifier system includes a high-power pump laser and a directional coupler. The optical amplification occurs in the transmission fibre itself, distributed along the transmission path of the optical signal. As optical fibres consist of amorphous silicon a spectrum of Raman scattering is provided such that the whole spectrum used in the WDM system is amplified as well as the noise using a single wavelength pump. The gain spectrum as well as the fibre losses result in a non-equal power of the individual channels, which requires some sort of successive gain-flattening, for example by means of variable optical attenuators.

A high-power pumping unit for a Raman system is known from Yoshihiro Emori and Shu Namiki, 'Demonstration of Broadband Raman Amplifiers: a Promising Application of High-power Pumping Unit', Furukawa review, number 19, 2000.

Further, usage of silicon-on-insulator (SOI) instead of an optical fibre has been published (R. Claps et al, 'Stimulate Raman scattering in silicon waveguides', Electronics Letters, vol. 38 No. 22, October 2002, and R. Claps et el 'Observation of Raman emission in silicon waveguides at 1.54 µn ', Optics Express, vol. 10, No. 22 November 2002).

SUMMARY OF THE INVENTION

The present invention provides for an improved Raman amplifier system using a crystalline material as an optical waveguide. This is based on the discovery that crystalline materials have a well defined Raman wavelength shift rather than a spectrum of Raman wavelength shift as it is the case for optical fibres consisting of amorphous silicon which are used in prior art Raman amplifier systems. Usage of a crystalline material enables to concentrate the Raman amplification effect to a specific optical wavelength which reduces the required interaction length of the pump light and the optical signal to be amplified and also prevents the amplification of noise.

In accordance with a preferred embodiment of the invention a semiconductor is used as a waveguide material. Preferably semiconductors from group IV, II–VI or III–V are used, such as indium-phosphite, gallium-arsenite, silicon-germanium.

In accordance with a further preferred embodiment of the invention the optical waveguide is provided by a semiconductor-on-insulator structure, such as a silicon-on-insulator (SOI) structure. Usage of such a structure has the advantage that state of the art semiconductor fabrication methods can be used for fabrication of the wave guide and that the required interaction length of the optical signal to be amplified and the pump light can be further reduced to the order of 1 cm which enables fabrication of the Raman amplifer system as an integrated circuit chip.

In accordance with a further preferred embodiment of the invention the optical waveguide is provided by a membrane of a semiconductor layer. Usage of such a structure has the advantage that the confinement of the optical mode is enhanced as the refractive index contrast of the surrounding air-cladding is higher. This further reduces the interaction length of the system.

In accordance with a further preferred embodiment of the invention the optical waveguide is provided by a defect waveguide in a photonic crystal. Usage of such a structure has the advantage that the confinement of the optical mode can be enhanced due to the photonic bandgap of the surrounding material. The enhanced confinement can be vertical, lateral or both. This further reduces the interaction length of the system.

In accordance with a further preferred embodiment of the invention isotopically purified crystalline material, such as an isotopically purified semiconductor is used for the optical waveguide. Isotopically purified semiconductors are as such known from the prior art (cf. Steven J. Bunden, 'High thermal conductivity silicon', semiconductor fabtech 13th edition, page 297). Usage of isotopically purified crystalline material in accordance with the present invention is based on the discovery that different isotopes of the same element have slightly different Raman wavelength shifts. Using isotopically purified crystalline material for the optical waveguide of the Raman system has thus the advantage that the Raman wavelength shift is determined with even greater precision. This further concentrates the Raman amplification effect to the desired wavelength and enables to further reduce the interaction length of the pump light and the optical signal to be amplified.

In accordance with a further preferred embodiment of the invention separate laser pumps are provided for a plurality of optical signals having different wavelengths (a WDM system). The wavelengths of the laser pumps precisely match the wavelengths of the optical signals to be amplified minus the Raman wavelength shift of the crystalline material of the optical wave guide. This enables to precisely control the amplification of each individual optical signal and makes usage of variable optical attenuators redundant.

BRIEF DESCRIPTION OF THE DRAWINGS

In the following a preferred embodiment of the invention will be described in greater detail by making reference to the drawing in which.

DETAILED DESCRIPTION

Figure 1:
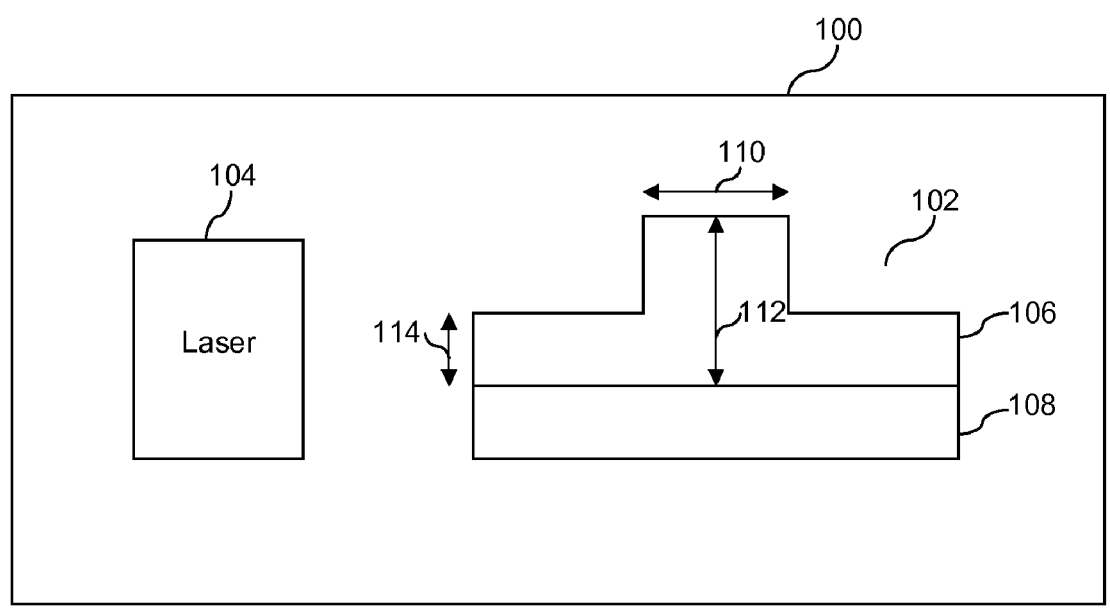
FIG. 1 shows a block diagram of a Raman amplifier system with a semiconductor-on-insulator optical waveguide.

FIG. 1 shows Raman amplifier system 100 which comprises an optical waveguide 102 and laser 104. In the preferred embodiment considered here optical waveguide 102 is a semiconductor-on-insulator waveguide. For example rib-like waveguide layer 106 consists of crystalline silicon and is located on insulator 108, such as silicon dioxide ($SiO_2$). For example the width 110 of waveguide layer 106 is between 0.5 µm to 10 µm, height 112 is between 1 µm and 10 µm, and height 114 is between 0.25 µm and 7 µm. Preferably the semiconductor material of waveguide layer 106 is isotopically purified for greater precision of the Raman amplification.

Laser 104 serves as a source of pump light which is coupled into optical waveguide 102 for amplification of an optical signal which propagates through optical waveguide 102.

When the semiconductor material which constitutes waveguide layer 106 has a Raman wavelength shift of $\Delta\lambda$ and the optical signal propagating through waveguide layer 106 has a wavelength of $\lambda_1$, a wavelength of $\lambda_2$ is selected for laser 104, where $\lambda_2 = \lambda_1 - \Delta\lambda$.

When there are multiple optical signals propagating through optical waveguide 102, there needs to be a corresponding number of sources for pump light at the corresponding wavelengths. For example if there is an additional optical signal having a wavelength $\lambda_3$ there needs to be an additional source for pump light having a wavelength of $\lambda_4 = \lambda_3 - \Delta\lambda$.

It is a particular advantage of Raman amplifier system 100 that it can be implemented on a single integrated circuit chip with an interaction length of e.g. 0.25 cm to 1 cm. The length of optical waveguide 102 can even be shorter especially if isotopically purified semiconductor material is used for waveguide layer 106.

LIST OF REFERENCE NUMERALS

100 Raman amplifier system
102 optical waveguide
104 laser
106 waveguide layer
108 insulator
110 width
112 height
114 height

The invention claimed is:

1. A Raman amplifier system comprising:
    an optical wave guide having an isotopically purified crystalline material, for guiding an optical signal having a first wavelength, the crystalline material having a Raman wavelength shift,
    a pump configured to pump light into the optical wave guide, the pump light having a second wavelength being substantially equal to the first wavelength minus the Raman wavelength shift.

2. The Raman amplifier system of claim 1, the crystalline material being a semiconductor material, preferably a semiconductor material from group IV, III–V or II–VI, such as silicon, indium-phosphite, gallium-arsenite or silicon-germanium.

3. The Raman amplifier system of claim 1, wherein said crystalline material is a semiconductor.

4. The Raman amplifier system of claim 1, the optical waveguide being provided by a membrane of a semiconductor layer.

5. The Raman amplifier system of claim 1, the optical waveguide being provided by a defect waveguide in a photonic crystal.

6. The Raman amplifier system of claim 1, further comprising a plurality of the pumps for separate Raman amplification of a plurality of optical signals having a plurality of wavelengths.

7. A method of generating a Raman gain, the method comprising the steps of:
    providing an optical wave guide an isotopically purified crystalline material,
    propagating an optical signal through the optical wave guide, the optical signal having a first wavelength,
    introducing of pump light into the optical wave guide, the pump light having a second wavelength being substantially equal to the first wavelength minus the Raman wavelength shift.

8. The method of claim 7, further comprising:
    propagating at least a second optical signal having a third wavelength through the optical wave guide,
    introducing pump light into the optical wave guide, the pump light having a fourth wavelength being substantially equal to the third wavelength minus the Raman wavelength shift.

9. The Raman amplifier system of claim 1, wherein said rib-like structure comprises a layer of said crystalline material having a first thickness on either side of a rib section of greater thickness than said first thickness.

10. The Raman amplifier system of claim 1, wherein said crystalline material comprises a rib-like geometry of crystalline material on an insulator layer.

11. The Raman amplifier system of claim 3, wherein said crystalline material comprises silicon.

12. The method of claim 7, wherein said crystalline material comprises silicon.

* * * * *